(12) United States Patent
Wang et al.

(10) Patent No.: US 12,476,482 B2
(45) Date of Patent: Nov. 18, 2025

(54) EXCITATION FUSE DEVICE AND UPS BATTERY CIRCUIT

(71) Applicant: Vertiv Corporation, Westerville, OH (US)

(72) Inventors: Ying Wang, Guangdong (CN); Wei Xu, Guangdong (CN); Ping Gong, Guangdong (CN)

(73) Assignee: VERTIV CORPORATION, Westerville, OH (US)

( * ) Notice: Subject to any disclaimer, the term of this patent is extended or adjusted under 35 U.S.C. 154(b) by 158 days.

(21) Appl. No.: 18/393,506

(22) Filed: Dec. 21, 2023

(65) Prior Publication Data

US 2024/0396368 A1 Nov. 28, 2024

(30) Foreign Application Priority Data

May 24, 2023 (CN) .......................... 202321283698.3

(51) Int. Cl.
*H02J 9/06* (2006.01)
*H01H 85/02* (2006.01)

(52) U.S. Cl.
CPC .............. *H02J 9/068* (2020.01); *H02J 9/061* (2013.01); *H01H 85/02* (2013.01)

(58) Field of Classification Search
CPC ........ H01H 39/00; H01H 85/02; H02H 3/087; H02H 7/26; H02H 9/061; H02H 9/068
USPC .......................................................... 361/41
See application file for complete search history.

(56) References Cited

U.S. PATENT DOCUMENTS

2022/0278520 A1\* 9/2022 Boury ...................... H02H 3/05

FOREIGN PATENT DOCUMENTS

| CN | 115498595 A | \* 12/2022 | ............... H02H 3/08 |
| DE | 102017214302 A1 | 2/2019 | |
| KR | 101768844 B1 | 8/2017 | |

OTHER PUBLICATIONS

Machine translation of Liu et al. Chinese Patent Document CN 115498595 A Dec. 2022 (Year: 2022).\*
Extended European Search Report regarding Application No. 23217118. 1, dated Jul. 4, 2024.

\* cited by examiner

*Primary Examiner* — Kevin J Comber
(74) *Attorney, Agent, or Firm* — Harness, Dickey & Pierce, P.L.C.

(57) ABSTRACT

An excitation fuse device and a UPS battery circuit are provided including an excitation fuse and a voltage driving control module including a voltage detection circuit to detect a fuse device voltage and generate a voltage detection signal based on the fuse device voltage and a reference voltage, a fusing controller to receive voltage detection signal and generate a voltage control signal based on voltage detection signal and a fuse detection signal, and a fuse circuit to generate a fusing control signal based on the voltage control signal, which includes a current fuse to be fused based on a short-circuit current and a detonating breaker to be switched off based on the fusing control signal. The current fuse is connected to the fuse circuit through the detonating breaker, the fusing controller is connected to the voltage detection circuit, the fuse circuit and the excitation fuse.

9 Claims, 4 Drawing Sheets

EXCITATION FUSE DEVICE AND UPS BATTERY CIRCUIT

CROSS-REFERENCE TO RELATED APPLICATION

This application claims priority to Chinese Patent Application No. 202321283698.3 filed on May 24, 2023 and entitled "INTELLIGENT EXCITATION FUSE DEVICE AND UPS BATTERY CIRCUIT", the disclosure of which is incorporated herein by reference in its entirety.

FIELD

The present disclosure relates to the field of UPS, and in particular to an excitation fuse device and a UPS battery circuit including the excitation fuse device.

BACKGROUND

The utilization of the uninterruptible power supply (UPS) lays a solid foundation for the development of the whole data center. With the development of society, there is an increasing demand for the modular UPS. Major manufacturers launched parallel UPS systems with different power levels. These parallel UPS systems with different power levels are connected to a battery with a circuit topology as shown in a single UPS module battery circuit in FIG. 1 or a multi UPS module battery circuit in FIG. 3. For the above-mentioned circuit topology in which only positive/negative wires are connected to the battery, in a case that the number of the applied batteries are relatively high, a short circuit on a half of the bus of the module will cause the full battery voltage to be applied to a capacitor of the other half of the bus of all parallel UPS modules, which results in overvoltage on the bus, thereby resulting in a failure of the overall UPS system. In this case, a failure in one module results in a failure of the overall UPS system, which does not meet the requirement that a failure of a single module in a modular UPS does not affect a normal operation of other modules. In the conventional solution to the above problem, it is desired that when a fault of a single module is detected, a power fuse is fused to disconnect the faulty module from the UPS system.

For the single UPS module battery circuit shown in FIG. 1, as shown in FIG. 2, in a case that the single UPS module battery circuit operates under a mains electricity working condition, when a positive half of the bus is short circuited (as indicated by A), since a voltage of the battery is greater than a voltage on the bus, the energy of the battery is supplied to a negative half of the bus through a loop (i.e. a circuit indicated by dashed lines and arrows in FIG. 2) formed by a power fuse Fuse1, a relay RLY1, a battery inductor L1, a bulk diode of a switch transistor Q1, the bus, a bulk diode of a switch transistor Q3, a battery inductor L2, a relay RLY2 and a power fuse Fuse2. In the conventional solution, the power fuse Fuse1 and the power fuse Fuse2 are fused. As it is the single UPS module, as long as one of the fuses is fused and the loop disappears, the voltage on the other half of the bus will not be raised to ultimately cause explosion. The same applies in a case that the single UPS module battery circuit operates under a discharger working condition.

For the multi UPS module battery circuit shown in FIG. 3, in a case that the multiple modules are connected in parallel, if only a power fuse Fuse2 on a non-fault side of the bus is fused, the energy of the battery continues to be supplied to the other half of the bus of other parallel UPS modules through a loop (a loop indicated by dashed lines and arrows in FIG. 3) formed by a battery power fuse Fuse1, a relay RLY1, a bulk diode of a switch transistor Q1, a bus of the faulty module, a bus of the parallel modules, a bulk diode of a switch transistor Q6, a relay RLY4, and a battery power fuse Fuse4. In a case that the battery and UPS system cannot be disconnected in time, arcing may occur on the other half of the bus, resulting in that the power fuse cannot be fused. That is, a short-circuit fault occurs on a half of the bus, and ultimately a fault of the UPS system is resulted in.

SUMMARY

In order to solve the above disadvantages in the prior art, an excitation fuse device and a UPS battery circuit including the excitation fuse device are provided according to the present disclosure, which can detect and control the faulty side to be fused in a case of a short-circuit fault occurring on a half of a bus, so as to prevent a failure of the UPS system.

The following technical solutions are provided according to the present disclosure to solve the technical problems. An excitation fuse device is provided. The excitation fuse device includes an excitation fuse and a voltage driving control module, wherein the excitation fuse includes a current fuse and a detonating breaker; and the voltage driving control module includes a voltage detection circuit, a fusing controller, and a fuse circuit; wherein the voltage detection circuit is configured to detect a voltage of the excitation fuse device and generate a voltage detection signal based on the voltage of the excitation fuse device and a reference voltage; the fusing controller is configured to receive the voltage detection signal and generate a voltage control signal based on the voltage detection signal and a fuse detection signal; and the fuse circuit is configured to generate a fusing control signal based on the voltage control signal for switching off the detonating breaker; the current fuse is electrically connected to the fuse circuit through the detonating breaker, the fusing controller is respectively communicatively connected to the voltage detection circuit and the fuse circuit, and the fuse circuit is communicatively connected to the excitation fuse, wherein the fuse circuit is configured to be fused based on a short-circuit current and includes a first switch transistor, a first diode, and a first resistor, wherein a control terminal of the first switch transistor is connected to a cathode of the first diode; an anode of the first diode receives the voltage control signal; a first terminal of the first switch transistor is connected to a switch-transistor power supply, and a second terminal of the first switch transistor is connected to the detonating breaker and a first terminal of the first resistor; a second terminal of the first resistor is grounded; and the second terminal of the first switch transistor outputs the fusing control signal.

In the excitation fuse device according to the present disclosure, the fuse circuit includes a first switch transistor, a first diode, and a first resistor. A control terminal of the first switch transistor is connected to a cathode of the first diode. An anode of the first diode receives the voltage control signal. A first terminal of the first switch transistor is connected to a switch-transistor power supply, and a second terminal of the first switch transistor is connected to the detonating breaker and a first terminal of the first resistor. A second terminal of the first resistor is grounded. The second terminal of the first switch transistor outputs the fusing control signal.

In the excitation fuse device according to the present disclosure, the fuse circuit further includes: a first capacitor, a second resistor, and a third resistor. The second resistor is connected between the control terminal of the first switch transistor and the ground. The first capacitor is connected between the control terminal of the first switch transistor and the ground. The third resistor is connected between the second terminal of the first switch transistor and the detonating breaker.

In the excitation fuse device according to the present disclosure, the first switch transistor includes a bipolar junction transistor, the control terminal of the first switch transistor serves as a base of the bipolar junction transistor, the first terminal of the first switch transistor serves as a collector of the bipolar junction transistor, and the second terminal of the first switch transistor serves as an emitter of the bipolar junction transistor. Alternatively, the first switch transistor includes an MOS transistor, the control terminal of the first switch transistor serves as a gate of the MOS transistor, the first terminal of the first switch transistor serves as a drain of the MOS transistor, and the second terminal of the first switch transistor serves as a source of the MOS transistor. Alternatively, the first switch transistor includes an IGBT transistor, the control terminal of the first switch transistor serves as a gate of the IGBT transistor, the first terminal of the first switch transistor serves as a drain of the IGBT transistor, and the second terminal of the first switch transistor serves as a source of the IGBT transistor.

In the excitation fuse device according to the present disclosure, the voltage detection circuit includes a comparator, a first resistor module, a second resistor module, a third resistor module, a fourth resistor module, a second capacitor, a first RC parallel module, and a second RC parallel module. A first terminal of the first resistor module receives the voltage of the excitation fuse device, and a second terminal of the first resistor module is connected to a first input terminal of the comparator through the second resistor module. A first terminal of the third resistor module receives a neutral wire voltage, and a second terminal of the third resistor module is connected to a second input terminal of the comparator through the fourth resistor module. The second capacitor is connected between the second terminal of the first resistor module and the second terminal of the third resistor module. The first input terminal of the comparator receives the reference voltage through the first RC parallel module. The second RC parallel module is connected between the second input terminal and an output terminal of the comparator. The output terminal of the comparator outputs the voltage detection signal.

In the excitation fuse device according to the present disclosure, the voltage detection circuit further includes a first voltage stabilizing module, a second voltage stabilizing module, a third voltage stabilizing module, and an output resistor. The first input terminal of the comparator is connected to the first voltage stabilizing module. The second input terminal of the comparator is connected to the second voltage stabilizing module. The output terminal of the comparator is connected to the third voltage stabilizing module through the output resistor.

In the excitation fuse device according to the present disclosure, the first voltage stabilizing module includes a first voltage stabilizing diode and a second voltage stabilizing diode. A cathode of the first voltage stabilizing diode and an anode of the second voltage stabilizing diode are connected to the first input terminal of the comparator. An anode of the first voltage stabilizing diode and a cathode of the second voltage stabilizing diode are connected to a diode power supply.

In the excitation fuse device according to the present disclosure, the second voltage stabilizing module includes a third voltage stabilizing diode and a fourth voltage stabilizing diode. An anode of the third voltage stabilizing diode and a cathode of the fourth voltage stabilizing diode are connected to the second input terminal of the comparator. A cathode of the third voltage stabilizing diode and an anode of the fourth voltage stabilizing diode are connected to a diode power supply.

In the excitation fuse device according to the present disclosure, the third voltage stabilizing module includes a first Zener diode and a second Zener diode. An anode of the first Zener diode is grounded. A cathode of the first Zener diode is connected to an anode of the second Zener diode. A cathode of the second Zener diode is connected to a Zener-diode power supply.

The following technical solutions are provided according to the present disclosure to solve the technical problems. A UPS battery circuit is provided. The UPS battery circuit includes a battery unit, at least one UPS battery circuit module connected between a positive pole and a negative pole of the battery unit, and the excitation fuse device described above. The excitation fuse device is connected to the positive pole of the battery unit. The voltage detection circuit detects a voltage of the excitation fuse device of the UPS battery circuit. The current fuse is fused based on the short-circuit current of the UPS battery circuit, or the detonating breaker is switched off based on the fusing control signal.

An excitation fuse device and a UPS battery circuit including the excitation fuse device according to the embodiments of the present disclosure is implemented. The excitation fuse device is applied on a battery side. When a short-circuit fault occurs on a half of a bus, the voltage of the excitation fuse device can be detected and whether the faulty side has been fused can be determined based on the voltage of the excitation fuse device and reference voltage. In a case of determining that the faulty side has not been fused, the detonating breaker of the excitation fuse device on the faulty side is controlled to be fused for fuse protection, so as to prevent expansion of the fault.

BRIEF DESCRIPTION OF THE DRAWINGS

The present disclosure is described in detail below in conjunction with the drawings and the embodiments. In the drawings.

DETAILED DESCRIPTION OF EMBODIMENTS

In order to make the objectives, the technical solutions and advantages of the present disclosure more clear, the present disclosure is further described in detail below in conjunction with the drawings and the embodiments. It should be noted that the embodiments described herein are only used for explaining the present disclosure and are not intended to limit the present disclosure.

Figure 4:
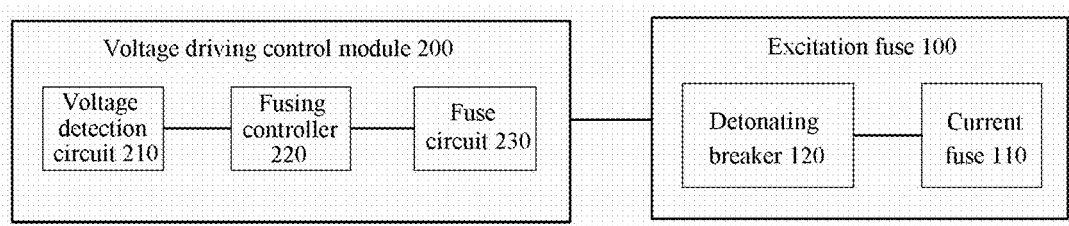
FIG. 4 is a block diagram showing a principle of an excitation fuse device according to the present disclosure.

FIG. 4 is a block diagram showing a principle of an excitation fuse device according to the present disclosure. As shown in FIG. 4, the excitation fuse device includes an excitation fuse 100 and a voltage driving control module 200. The voltage driving control module 200 includes a voltage detection circuit 210, a fusing controller 220, and a fuse circuit 230. The voltage detection circuit 210 is configured to detect a voltage of the excitation fuse device and generate a voltage detection signal based on the voltage of the excitation fuse device and a reference voltage. The fusing controller 220 is configured to receive the voltage detection signal and generate a voltage control signal based on the voltage detection signal and a fuse detection signal. The fuse circuit 230 is configured to generate a fusing control signal based on the voltage control signal. The excitation fuse 100 includes a current fuse 110 and a detonating breaker 120. The current fuse 110 is configured to be fused based on a short-circuit current. The detonating breaker 120 is configured to be switched off based on the fusing control signal. The current fuse 110 is electrically connected to the fuse circuit 230 through the detonating breaker 120, and the fusing controller 220 is respectively communicatively connected to the voltage detection circuit 210 and the fuse circuit 230, and the fuse circuit 230 is communicatively connected to the excitation fuse 100.

In a preferred embodiment of the present disclosure, the excitation fuse 100 may be implemented as any excitation fuse known in the art, for example, the SFM series excitation fuse produced by Xi'An Sinofuse Electric Co., Ltd. The excitation fuse 100 includes the current fuse 110 and the detonating breaker 120. The current fuse 110 is fused when a current flowing through the current fuse 110 has exceeded a threshold, and is not fused when the current flowing through the current fuse 110 is less than the threshold. The detonating breaker 120 is switched off in response to receiving a control signal for controlling the detonating breaker 120 to be switched off rather than in response to a change of a current flowing through the detonating breaker 120. Whether the detonating breaker 120 is switched off or the current fuse 110 is fused, it will cause the excitation fuse 100 to be disconnected. After the excitation fuse 100 is disconnected, the fusing controller 220 receives a fuse detection signal and obtains a fuse condition of the excitation fuse 100 based on the fuse detection signal.

In the present disclosure, the voltage detection circuit 210 may be implemented as any voltage detection comparison chip, circuit, or unit known in the art, as long as the voltage detection circuit 210 can detect the voltage of the excitation fuse device and compare the voltage of the excitation fuse device with the reference voltage. In subsequent embodiments of the present disclosure, a preferred voltage detection comparison circuit is provided. The voltage detection circuit 210 is configured to detect the voltage of the excitation fuse device, and generate the voltage detection signal based on the voltage of the excitation fuse device and the reference voltage. For example, the voltage detection circuit 210 generates a voltage detection signal indicating that the excitation fuse device has been disconnected from the bus in a case that the voltage of the excitation fuse device is less than the reference voltage, and generates a voltage detection signal indicating that the excitation fuse device has not been disconnected from the bus in a case that the voltage of the excitation fuse device is greater than the reference voltage.

In the present disclosure, the fusing controller 220 is electrically connected to the voltage detection circuit 210 to receive the voltage detection signal from the voltage detection circuit 210. In addition, the fusing controller 220 is further communicatively connected to a control system of the UPS battery circuit to receive the fuse detection signal. The fuse detection signal may indicate whether a short-circuit fault occurs on a half of the bus. The fuse detection signal may be generated by any bus-voltage detection circuit module known in the art, which is not the invention point of the present disclosure, and is not repeated here.

The fusing controller 220 generates a voltage control signal based on the voltage detection signal and the fuse detection signal. That is, in a case of the fuse detection signal indicating that a short-circuit fault occurs on a half of the bus, the fusing controller 220 determines, based on the voltage detection signal, whether an excitation fuse on the faulty side (for example, Fuse1 side shown in FIG. 3) is fused. The fusing controller 220 sends out a voltage control signal in a case of determining that the excitation fuse on the faulty side is not fused, and does not send out a voltage control signal in a case of determining that the excitation fuse on the faulty side is fused, in this case since the excitation fuse on the faulty side has been fused, no fault expansion will occur. Here, the fusing controller 220 may be implemented by any DSP module known in the art, for example, Stratix® Series produced by Intel. Alternatively, the fusing controller 220 may also be implemented by any known comparator module or circuit, or by a comparator circuit, and a NAND gate logic circuit.

In the present disclosure, the fuse circuit 230 may also be implemented by any appropriate switching circuit. The fuse circuit 230, when receiving the voltage control signal, generates a fusing control signal for controlling the detonating breaker 120 to be switched off. In subsequent embodiments of the present disclosure, a preferred fuse circuit is provided.

Figure 1:
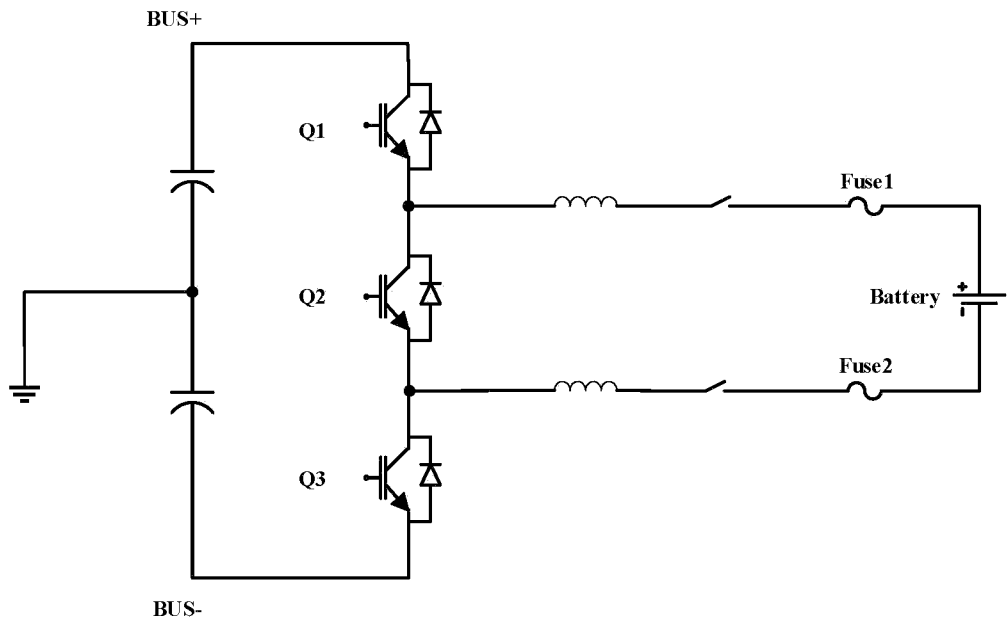
FIG. 1 is a circuit diagram of a single UPS module battery circuit to which a power fuse is applied according to the prior art.
Figure 2:
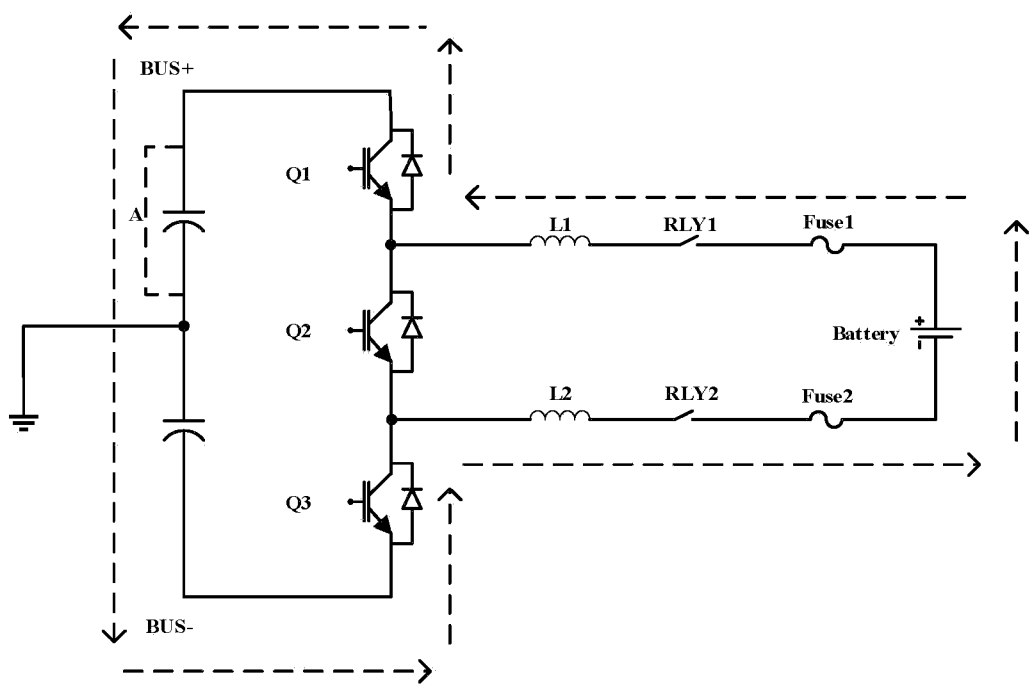
FIG. 2 is a schematic diagram showing simulation of the single UPS module battery circuit shown in FIG. 1 in a case of a failure of the single module.
Figure 3:
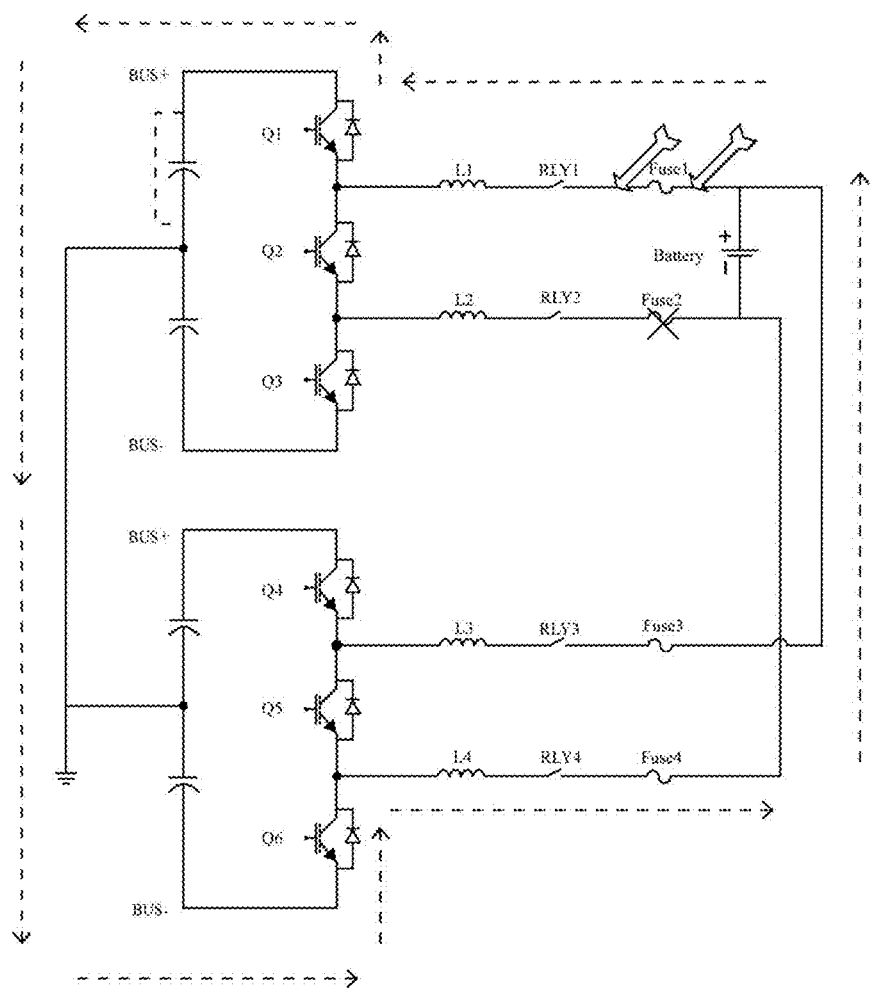
FIG. 3 is a schematic diagram showing simulation of the multi UPS module battery circuit to which a power fuse is applied according to the prior art in a case of a failure of the multiple modules.
Figure 5:
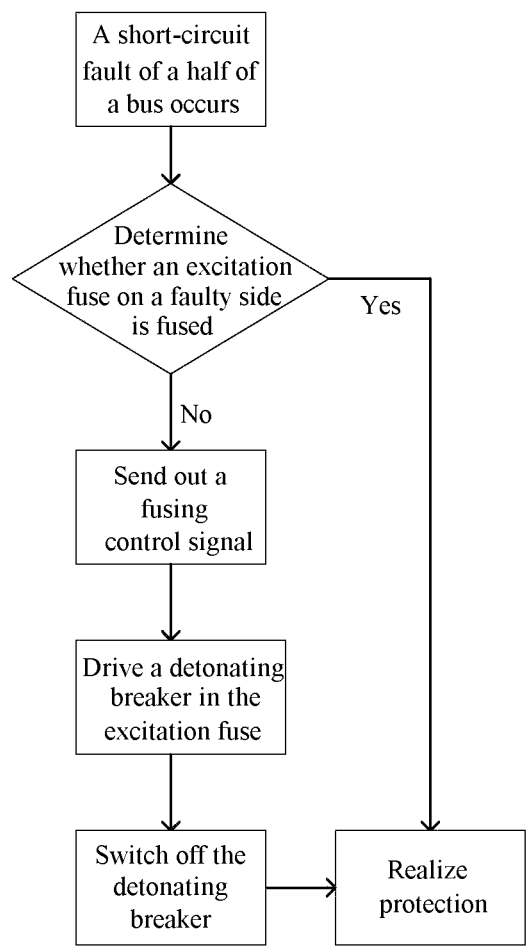
FIG. 5 is a flowchart of controlling the excitation fuse device according to the present disclosure.

In specific applications of the present disclosure, it can be seen from the circuit topologies shown in FIG. 1 to FIG. 3 that when a short-circuit fault occurs, since there is a current fuse 110, the current fuse 110 on the faulty side is fused based on a short-circuit current. For the embodiments shown in FIG. 1 and FIG. 2, only the circuit on one side is required to be fused rather than both current fuses, and thus the fault maintenance loss can be reduced. However, for the embodiment shown in FIG. 3, it may cause a fault on a half of the bus, and the specific control process is as shown in FIG. 5.

The voltage detection circuit 210 is configured to detect a voltage of the excitation fuse device and generate a voltage detection signal indicating that the excitation fuse device has been disconnected from the bus in a case that the voltage of the excitation fuse device is less than the reference voltage, and generates a voltage detection signal indicating that the excitation fuse device has not been disconnected from the bus in a case that the voltage of the excitation fuse device is greater than the reference voltage. The fusing controller 220 simultaneously receives a fuse detection signal indicating whether a fault occurs on a half of the bus and a voltage detection signal indicating whether the excitation fuse device is disconnected from the bus. In a case that the fuse detection signal indicating that a fault occurs on a half of the bus and a voltage detection signal indicating that the excitation fuse device is not disconnected from the bus are simultaneously received, the fusing controller 220 determines that the excitation fuse on the faulty side is not fused at this time and sends out a voltage control signal. In a case that the excitation fuse on the faulty side has been fused at this time, it indicates that the entire circuit has been protected and no further processing is required. The fuse circuit 230, on reception of the voltage control signal, generates a fusing control signal for controlling the detonating breaker 120 to be fused. At this time, the detonating breaker 120 is switched off and the entire circuit is protected.

An excitation fuse device according to the present disclosure is implemented. The excitation fuse device is applied on a battery side. When a short-circuit fault occurs on a half of the bus, the voltage of the excitation fuse device can be detected and whether the faulty side has been fused can be determined based on the voltage of the excitation fuse device and reference voltage. In a case of determining that the faulty side has not been fused, the detonating breaker of the excitation fuse device on the faulty side is controlled to be fused for fuse protection, so as to prevent expansion of the fault.

Figure 6:
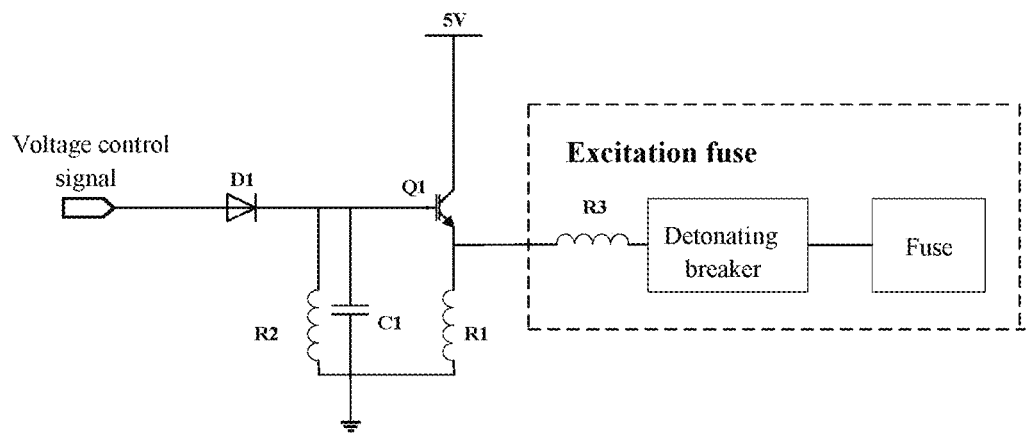
FIG. 6 is a circuit diagram showing connection of a preferred embodiment of a fuse circuit and an excitation fuse in the excitation fuse device shown in FIG. 4.

FIG. 6 is a circuit diagram showing connection of the fuse circuit and the excitation fuse in the excitation fuse device shown in FIG. 4. As shown in FIG. 6, the fuse circuit 230 includes a switch transistor Q1, a diode D1, and a resistor R1. A control terminal of the switch transistor Q1 is connected to a cathode of the diode D1. An anode of the diode D1 receives the voltage control signal. A first terminal of the switch transistor Q1 is connected to a 5V switch-transistor power supply, and a second terminal of the switch transistor Q1 is connected to the detonating breaker 120 and a first terminal of the resistor R1. A second terminal of the resistor R1 is grounded.

In the preferred embodiment shown in FIG. 6, the fused circuit 230 further includes a capacitor C1, a resistor R2, and a resistor R3. The resistor R2 is connected between the control terminal of the switch transistor Q1 and the ground. The capacitor C1 is connected between the control terminal of the switch transistor Q1 and the ground. The resistor R3 is connected between the second terminal of the switch transistor Q1 and the detonating breaker 120 of the excitation fuse 100.

In the excitation fuse device according to the present disclosure, the switch transistor Q1 may be a bipolar junction transistor, a MOS transistor, or an IGBT transistor. In the embodiment shown in FIG. 6, the switch transistor Q1 is a bipolar junction transistor. The control terminal of switch transistor Q1 serves as a base of the bipolar junction transistor. The first terminal of switch transistor Q1 serves as a collector of the bipolar junction transistor. The second terminal of the switch transistor Q1 serves as an emitter of the bipolar junction transistor. Apparently, in other preferred embodiments of the present disclosure, the switch transistor Q1 may also be a MOS transistor or an IGBT transistor. In this case, the control terminal of the switch transistor Q1 serves as a gate of the MOS transistor or a gate of the IGBT transistor, the first terminal of the switch transistor Q1 serves as a drain of the MOS transistor or a drain of the IGBT transistor, and the second terminal of the switch transistor Q1 serves as a source of the MOS transistor or a source of the IGBT transistor.

Figure 7:
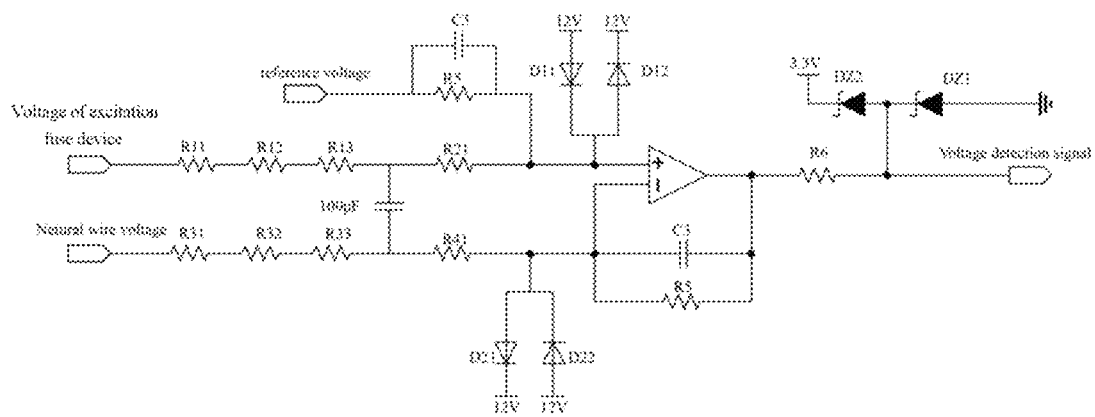
FIG. 7 is a preferred embodiment of a voltage detection circuit in the excitation fuse device shown in FIG. 4.

FIG. 7 is a circuit diagram showing a preferred embodiment of the voltage detection circuit of the excitation fuse device shown in FIG. 4. As shown in FIG. 7, the voltage detection circuit 210 includes a comparator Comp1, a first resistor module, a second resistor module, a third resistor module, a fourth resistor module, a capacitor C2, a first RC parallel module 211, and a second RC parallel module 212. As shown in FIG. 7, the first resistor module includes resistors R11, R12, and R13 that are connected in series. The second resistor module includes a resistor R21. The third resistor module includes resistors R31, R32, and R33 that are connected in series. The fourth resistor module includes a resistor R41. Each of the first RC parallel module 211 and the second RC parallel module 212 is formed by a resistor R5 and a capacitor C3 that are connected in parallel. Apparently, in other preferred embodiments of the present disclosure, each resistor module may include more or less resistors. Preferably, the resistance value of the first resistor module is the same as that of the third resistor module, and the resistance value of the second resistor module is the same as that of the fourth resistor module. The parameters of the first RC parallel module 211 are the same as those of the second RC parallel module 212.

A first terminal of the first resistor module receives the voltage of the excitation fuse device, and a second terminal of the first resistor module is connected to a first input terminal of the comparator Comp1 through the second resistor module. A first terminal of the third resistor module receives a neutral wire voltage, and a second terminal of the third resistor module is connected to a second input terminal of the comparator Comp1 through the fourth resistor module. The capacitor C2 is connected between the second terminal of the first resistor module and the second terminal of the third resistor module. The first input terminal of the comparator Comp1 receives the reference voltage through the first RC parallel module 211. The second RC parallel module 212 is connected between the second input terminal of the comparator Comp1 and the output terminal of the comparator Comp1. The output terminal of the comparator Comp1 outputs the voltage detection signal.

In the preferred embodiment shown in FIG. 7, the voltage detection circuit 210 further includes a first voltage stabilizing module, a second voltage stabilizing module, a third voltage stabilizing module, and an output resistor R6. The first input terminal of the comparator Comp1 is connected to the first voltage stabilizing module, the second input terminal of the comparator Comp1 is connected to the second voltage stabilizing module, and the output terminal of the comparator Comp1 is connected to the third voltage stabilizing module through the output resistor.

In the preferred embodiment shown in FIG. 7, the first voltage stabilizing module includes a voltage stabilizing diode D11 and a voltage stabilizing diode D12. A cathode of the voltage stabilizing diode D11 and an anode of the voltage stabilizing diode D12 are connected to the first input terminal of the comparator Comp1. An anode of the voltage stabilizing diode D11 and a cathode of the voltage stabilizing diode D12 are connected to a 12V diode power supply. The second voltage stabilizing module includes a voltage stabilizing diode D21 and a voltage stabilizing diode D22. An anode of the voltage stabilizing diode D21 and a cathode of the voltage stabilizing diode D22 are connected to the second input terminal of the comparator Comp1. A cathode of the voltage stabilizing diode D21 and an anode of the voltage stabilizing diode D22 are connected to a 12V diode power supply. The third voltage stabilizing module includes a Zener diode DZ1 and a Zener diode DZ2. An anode of the Zener diode DZ1 is grounded, and a cathode of the Zener diode DZ1 is connected to an anode of the Zener diode DZ2. A cathode of the Zener diode DZ2 is connected to a 3.3V Zener diode power supply.

A UPS battery circuit is further provided according to a preferred embodiment of the present disclosure. The UPS battery circuit includes a battery unit, at least one UPS battery circuit module connected between a positive pole and a negative pole of the battery unit, and the excitation fuse device described above. The excitation fuse device is connected to the positive pole of the battery unit. The voltage detection circuit 210 detects a voltage of the excitation fuse device of the UPS battery circuit. The current fuse 110 is fused based on a short-circuit current of the UPS battery circuit, or the detonating breaker 120 is switched off in response to the fusing control signal. Here, for the UPS battery circuit, reference may be made to the circuit structure shown in FIG. 1 or FIG. 3. Here, the excitation fuse device is connected at a position of the power fuse shown in FIG. 1 or FIG. 3. The principle is described in the description for the excitation fuse device, and is not repeated here.

An excitation fuse device and a UPS battery circuit including the excitation fuse device according to the embodiments of the present disclosure is implemented. The excitation fuse device is applied on a battery side. When a short-circuit fault occurs on a half of a bus, the voltage of the excitation fuse device can be detected and whether the faulty side has been fused can be determined based on the voltage of the excitation fuse device and reference voltage. In a case of determining that the faulty side has not been fused, the detonating breaker of the excitation fuse device on the faulty side is controlled to be fused for fuse protection, so as to prevent expansion of the fault.

Although the present disclosure is described by means of the embodiments, those skilled in the art should understand that various variations and equivalent substitutions can be made to the present disclosure without departing from the scope of the present disclosure. In addition, various modifications can be made to the present disclosure for specific situations or materials without departing from the spirit of the present disclosure. Therefore, the present disclosure is not limited to the disclosed specific embodiments, and should include all embodiments falling within the scope defined by the claims of the present disclosure.

The above only describes the preferred embodiments of the present disclosure, and is not intended to limit the present disclosure. Any modifications, equivalent substitutions, and improvements made within the spirit and the principle of the present disclosure should be included in the protection scope of the present disclosure.

The invention claimed is:

1. An excitation fuse device comprising an excitation fuse and a voltage driving control module, wherein the excitation fuse includes a current fuse and a detonating breaker; and the voltage driving control module includes a voltage detection circuit, a fusing controller, and a fuse circuit; wherein:
the voltage detection circuit is configured to detect a voltage of the excitation fuse device and generate a voltage detection signal based on the voltage of the excitation fuse device and a reference voltage;
the fusing controller is configured to receive the voltage detection signal and generate a voltage control signal based on the voltage detection signal and a fuse detection signal; and
the fuse circuit is configured to generate a fusing control signal based on the voltage control signal for switching off the detonating breaker;
the current fuse is electrically connected to the fuse circuit through the detonating breaker, the fusing controller is respectively communicatively connected to the voltage detection circuit and the fuse circuit, and the fuse circuit is communicatively connected to the excitation fuse, wherein the fuse circuit
is configured to be fused based on a short-circuit current and includes a first switch transistor, a first diode, and a first resistor, wherein:
a control terminal of the first switch transistor is connected to a cathode of the first diode;
an anode of the first diode receives the voltage control signal;
a first terminal of the first switch transistor is connected to a switch-transistor power supply, and a second terminal of the first switch transistor is connected to the detonating breaker and a first terminal of the first resistor;
a second terminal of the first resistor is grounded; and
the second terminal of the first switch transistor outputs the fusing control signal.

2. The excitation fuse device according to claim 1, wherein the fuse circuit further comprises:
a first capacitor;
a second resistor; and
a third resistor, wherein
the second resistor is connected between the control terminal of the first switch transistor and the ground;
the first capacitor is connected between the control terminal of the first switch transistor and the ground; and
the third resistor is connected between the second terminal of the first switch transistor and the detonating breaker.

3. The excitation fuse device according to claim 2, wherein:
the first switch transistor comprises a bipolar junction transistor, wherein the control terminal of the first switch transistor serves as a base of the bipolar junction transistor, the first terminal of the first switch transistor serves as a collector of the bipolar junction transistor, and the second terminal of the first switch transistor serves as an emitter of the bipolar junction transistor; or
the first switch transistor comprises an MOS transistor, wherein the control terminal of the first switch transistor serves as a gate of the MOS transistor, the first terminal of the first switch transistor serves as a drain of the MOS transistor, and the second terminal of the first switch transistor serves as a source of the MOS transistor; or
the first switch transistor comprises an IGBT transistor, wherein the control terminal of the first switch transistor serves as a gate of the IGBT transistor, the first terminal of the first switch transistor serves as a drain of the IGBT transistor, and the second terminal of the first switch transistor serves as a source of the IGBT transistor.

4. The excitation fuse device according to claim 1, wherein the voltage detection circuit comprises:
a comparator;
a first resistor module;
a second resistor module;
a third resistor module;
a fourth resistor module;
a second capacitor;
a first RC parallel module; and a second RC parallel module, wherein
a first terminal of the first resistor module receives the voltage of the excitation fuse device, and a second terminal of the first resistor module is connected to a first input terminal of the comparator through the second resistor module;
a first terminal of the third resistor module receives a neutral wire voltage, and a second terminal of the third resistor module is connected to a second input terminal of the comparator through the fourth resistor module;
the second capacitor is connected between the second terminal of the first resistor module and the second terminal of the third resistor module;
the first input terminal of the comparator receives the reference voltage through the first RC parallel module;
the second RC parallel module is connected between the second input terminal and an output terminal of the comparator; and
the output terminal of the comparator outputs the voltage detection signal.

5. The excitation fuse device according to claim 4, wherein the voltage detection circuit further comprises:
a first voltage stabilizing module;
a second voltage stabilizing module;
a third voltage stabilizing module; and
an output resistor, wherein
the first input terminal of the comparator is connected to the first voltage stabilizing module, the second input terminal of the comparator is connected to the second voltage stabilizing module, and the output terminal of the comparator is connected to the third voltage stabilizing module through the output resistor.

6. The excitation fuse device according to claim 5, wherein the first voltage stabilizing module comprises:
a first voltage stabilizing diode; and
a second voltage stabilizing diode, wherein
a cathode of the first voltage stabilizing diode and an anode of the second voltage stabilizing diode are connected to the first input terminal of the comparator, and an anode of the first voltage stabilizing diode and a cathode of the second voltage stabilizing diode are connected to a diode power supply.

7. The excitation fuse device according to claim 5, wherein the second voltage stabilizing module comprises:
a third voltage stabilizing diode; and
a fourth voltage stabilizing diode, wherein
an anode of the third voltage stabilizing diode and a cathode of the fourth voltage stabilizing diode are connected to the second input terminal of the comparator, and a cathode of the third voltage stabilizing diode and an anode of the fourth voltage stabilizing diode are connected to a diode power supply.

8. The excitation fuse device according to claim 5, wherein the third voltage stabilizing module comprises:
a first Zener diode; and
a second Zener diode, wherein
an anode of the first Zener diode is grounded, a cathode of the first Zener diode is connected to an anode of the second Zener diode, and a cathode of the second Zener diode is connected to a Zener-diode power supply.

9. A UPS battery circuit, comprising:
a battery unit;
at least one UPS battery circuit module connected between a positive pole and a negative pole of the battery unit; and
the excitation fuse device according to claim 1, wherein the excitation fuse device is connected to the positive pole of the battery unit, the voltage detection circuit detects a voltage of the
excitation fuse device of the UPS battery circuit, and the current fuse is fused based on the short-circuit current of the UPS battery circuit or the detonating breaker is switched off based on the fusing control signal.

* * * * *